(12) United States Patent
Miyauchi et al.

(10) Patent No.: US 7,691,512 B2
(45) Date of Patent: Apr. 6, 2010

(54) FUEL-CELL POWER-GENERATION SYSTEM AND METHOD

(75) Inventors: Shinji Miyauchi, Nara (JP); Masataka Ozeki, Izumi (JP); Koichi Nishimura, Higashiosaka (JP)

(73) Assignees: Panasonic Corporation, Osaka (JP); Matsushita Refrigeration Company, Osaka (JP)

(*) Notice: Subject to any disclaimer, the term of this patent is extended or adjusted under 35 U.S.C. 154(b) by 195 days.

(21) Appl. No.: 11/474,766

(22) Filed: Jun. 26, 2006

(65) Prior Publication Data
US 2006/0246325 A1    Nov. 2, 2006

Related U.S. Application Data

(63) Continuation of application No. 10/333,849, filed as application No. PCT/JP02/04933 on May 22, 2002, now abandoned.

(30) Foreign Application Priority Data

| May 23, 2001 | (JP) | ............................. 2001-154584 |
| Jun. 11, 2001 | (JP) | ............................. 2001-176231 |

(51) Int. Cl.
    H01M 8/04    (2006.01)
    H01M 2/14    (2006.01)
(52) U.S. Cl. ............................. 429/26; 429/24; 429/22; 429/38; 429/39
(58) Field of Classification Search ................... 429/26, 429/24, 22, 38, 39
    See application file for complete search history.

(56) References Cited

U.S. PATENT DOCUMENTS 6,596,426 B2 *  7/2003  Yang et al. ................... 429/26

7,282,285 B2 * 10/2007  Couch et al. ................... 429/13

FOREIGN PATENT DOCUMENTS

| EP | 02 73 0684 | 4/2009 |
| JP | 2-132766 | 5/1990 |

(Continued)

OTHER PUBLICATIONS

Japanese Search Report for Application No. PCT/JP02/04933 dated Sep. 5, 2002.

*Primary Examiner*—Dah-Wei Yuan
*Assistant Examiner*—Angela J. Martin
(74) *Attorney, Agent, or Firm*—RatnerPrestia

(57) ABSTRACT

A condenser condenses an unused exhaust gas exhausted from a fuel cell and recovers water, condensation-capacity detection means always monitors the condensation capacity of the condenser, control means controls an output of heat-transport-medium circulation means, stores the exhaust heat of the fuel cell in heat-using means when a sufficient condensation capacity is left, and stops the heat-transport-medium circulation means to complete exhaust-heat recovery when the condensation capacity lowers. Moreover, a fuel cell, a cooling pipe through which a first heating medium of carrying the heat of the fuel cell circulates, a cooling-water pump of circulating the first heating medium, and a fuel-cell-temperature detector of detecting the temperature of the fuel cell are used to operate a cooling-water pump until the temperature detected by the fuel-cell-temperature detector becomes a predetermine threshold value or less even after supply of a fuel and an oxidant to the fuel cell is stopped.

7 Claims, 9 Drawing Sheets

FOREIGN PATENT DOCUMENTS

| | | |
|---|---|---|
| JP | 2-230665 A | 9/1990 |
| JP | 6-325780 | 11/1994 |
| JP | 07-142077 | 6/1995 |
| JP | 7-142077 | 6/1995 |
| JP | 8-31435 A | 2/1996 |
| JP | 8-255623 | 10/1996 |
| JP | 9-283162 | 10/1997 |
| JP | 11-67254 | 3/1999 |
| JP | 2000-156236 * | 6/2000 |
| JP | 2000-294262 | 10/2000 |

* cited by examiner

FUEL-CELL POWER-GENERATION SYSTEM AND METHOD

This is a continuation application based on application Ser. No. 10/333,849, filed on Apr. 23, 2003, now abandoned which is a U.S. National Phase Application of PCT International Application PCT/JP02/04933 filed May 22, 2002, which is hereby incorporated by reference.

TECHNICAL FIELD

The present invention relates to a fuel-cell power-generation system and method of generating power or recovering exhaust heat by using a fuel cell.

BACKGROUND ART

A power-generation system using a conventional fuel cell is described below by referring to FIG. 9.

In FIG. 9, symbol 1 denotes a fuel cell and a fuel treater 2 water-vapor-reforms a material such as a natural gas, generates a gas mainly containing hydrogen, and supplies the gas to the fuel cell 1. The fuel treater 2 is provided with a reformer 3 of generating a reformed gas and a carbon-monoxide shifter 4 of making carbon monoxide react with water to produce carbon dioxide and hydrogen. A fuel-side humidifier 5 humidifies a fuel gas to be supplied to the fuel cell 1. Symbol 6 denotes an air feeder that supplies air serving as an oxidant to the fuel cell 1. In this case, an oxidation-side humidifier 7 humidifies supplied air. Moreover, the power-generation system is provided with a cooling pipe 8 of supplying water to the fuel cell 1 to cool it and a pump 9 of circulating the water in the cooling pipe 8.

Moreover, when generating power, the exhaust heat due to the power generation in the fuel cell 1 recovers in a hot-water storage tank 13 via an exhaust-heat recovery pipe 12 by a heat exchanger 10 and a circulating pump 11 under the connection of the system.

When generating power by the above system, the fuel treater 2 requires water in order to water-vapor-reform a material such as a natural gas by the reformer 3 and moreover make the carbon monoxide contained in the reformed gas react with water by means of the carbon-monoxide shifter 4 to produce carbon dioxide and hydrogen, the fuel-side humidifier 5 requires water to humidify a fuel gas to be supplied to the fuel cell 1, and the oxidation-side humidifier 7 requires water in order to humidify supplied air. The water required for the above power generation has been supplied as city water or ion exchange water from the outside.

However, the above conventional configuration has a problem that a reformation catalyst or shift catalyst stored in the reformer 3 or carbon-monoxide shifter 4 of the fuel treater 2 is deteriorated due to chlorine ions or metallic ions eluted from a pipeline when using general water such as city water in the fuel-gas pipeline or oxidant-gas pipeline of the fuel cell 1, or a fuel gas or oxidant gas is ionized and electric conductivity is raised to cause a trouble in power generation by the fuel cell.

Moreover, when providing ion removal means such as an ion exchange resin in order to remove chlorine ions of general water such as city water or metallic ions eluted from a pipeline for a fuel-gas supply system or oxidant-gas supply system, there is a problem that regular maintenance of the ion removal means is necessary to secure the ion-removing capacity in accordance with an operation time, the ion removal means must be regularly replaced, or large ion removal means must be used in order to reduce the frequency of regular replacement.

Moreover, a power-generation system using a conventional fuel cell has the following disadvantages.

That is, to complete the power generation by the fuel cell 1, generally the system stops supply of a power-generation material to a fuel generator 2 and at the same time, supplies an inert gas such as nitrogen to the fuel generator 2 and circulation channels of a material gas and fuel gas of the fuel cell 1 and exhausts a combustible gas from the fuel-cell power-generation system.

Moreover, because the fuel cell 1 stops generating heat simultaneously when power generation stops, the cooling-water pump 9 and city-water pump 11 stop their carrying operations and circulation of cooling water and city water stops.

In the case of the above fuel-cell power-generation system, after power generation has completed, an inert gas such as nitrogen coming out of the fuel generator 2 at approx. 700° C. through the circulation channel of a fuel gas passes through the fuel cell 1 and is exhausted to the outside from the fuel cell 1.

In this case, however, the fuel gas remaining in the fuel generator 2 and the circulation channel passes through the fuel cell 1 by being pushed by the inert gas while almost keeping its temperature and is exhausted to the outside. Therefore, it is estimated that the inside of the fuel cell 1 has a higher temperature at only a part through which this fuel gas passes.

At the time of using the polymer electrolyte type for the fuel cell 1, it is necessary that a polymer electrolyte film used for an electrolyte is wet. However, when an inert gas which has a high-temperature but which is not humidified flows nearby the polymer electrolyte film, the polymer electrolyte film is locally dried to cause the power-generation efficiency of the fuel cell 1 to extremely deteriorate.

Then, even if the fuel cell 1 stops power generation, it keeps a temperature of approx. 70° C. for awhile. Because the temperature is higher than an environmental temperature and the heat retained by the fuel cell 1 is only exhausted to the outside after circulation of cooling water is stopped. Therefore, it is necessary to use the heat of the fuel cell 1 also after power generation in order to effectively use the heat produced for the power generation.

DISCLOSURE OF THE INVENTION

It is an object of the present invention to provide a fuel-cell power-generation system and method which does not cause problems in power generation by a fuel cell without using ion removal means.

The present invention is achieved to solve the above problems and its object is to provide a fuel-cell power-generation system which avoids lowering the power-generation efficiency of a fuel cell after power generation is completed.

Moreover, it is an object of the present invention to provide a fuel-cell power-generation system capable of using the heat of a fuel cell even after power generation is completed.

To solve the above problems, a first aspect of the present invention is a fuel-cell power-generation system comprising:

a fuel cell of generating power by using a fuel gas and an oxidant gas;

a condenser of condensing at least some of the unused exhaust gas exhausted from said fuel cell; and water-using means of using the condensed water exhausted from said condenser for humidification of at least either of said fuel gas and said oxidant gas.

A second aspect of the present invention is the fuel-cell power-generation system according to the first aspect of the present invention, comprising:

heat exchange means of recovering exhaust heat due to the power generation of said fuel cell by means of heat exchange;

heat-using means of storing a heat transport medium recovering exhaust heat in said heat exchange means; and circulation means of circulating said heat transport medium between said heat exchange means and said heat-using means.

A third aspect of the present invention is the fuel-cell power-generation system according to the second aspect of the present invention, wherein said heat transport medium is constituted so as to pass through said condenser and contribute to condensation of the said unused exhaust gas in said condenser, and condensation-capacity detection means of detecting the condensation capacity of said condenser and control means of controlling the output of said circulation means in accordance with a detection signal of said condensation-capacity detection means are comprised.

By using the above configuration, water vapor of an unused exhaust gas exhausted from a fuel cell is condensed by a condenser to recover water, the condensation capacity of the condenser is always monitored by condensing-capacity-detection means, the output of circulation means is controlled by control means when the condensation capacity is kept, and the exhaust heat of the fuel cell is recovered and stored in heat-using means. Moreover, when the condensation capacity lowers, the circulation means is stopped to complete exhaust-heat recovery. Therefore, water can be self-supported without using outside water by using the recover water obtained by condensing water by a condenser for the water for water-vapor reformation by the reformer of a fuel treater, the water of making carbon monoxide react with water to produce carbon dioxide and hydrogen, the water of humidifying the fuel gas to be supplied to a fuel cell, and the water for humidifying supplied air by an oxidation-side humidifier.

Moreover, it is possible to prevent a reformation catalyst and shift catalyst stored in a reformer and carbon-monoxide shifter of a fuel treater from being deteriorated due to chlorine ions and the like when supplying water (city water) from the outside or metallic ions eluted from a pipeline. Furthermore, it is possible to prevent a trouble caused by the fact that a fuel gas or oxidant gas is ionized and thereby electric conductivity is raised from occurring in power generation by a fuel cell.

Furthermore, it is possible to reduce the frequency of regular maintenance of ion removal means or abolish the regular maintenance by greatly reducing the size of ion removal means such as ion exchange resins for removing chlorine ions from general water such as city water in a fuel-gas supply system and oxidant-gas supply system or preventing the deterioration of an ion-removing capacity according to operation time.

A fourth aspect of the present invention is the fuel-cell power-generation system according to the third aspect of the present invention, wherein said condensation-capacity detection means is condensed-water-temperature detection means of detecting the temperature of condensed water supplied from said condenser.

A fifth aspect of the present invention is the fuel-cell power-generation system according to the fourth aspect of the present invention, further comprising:

medium-temperature detection means of detecting a temperature of said heat transport medium recovering exhaust heat in said heat exchange means, and wherein said control means controls the output of said circulation means by also using the temperature of said heat transport medium detected by said medium-temperature detection means.

A sixth aspect of the present invention is the fuel-cell power-generation system according to the third aspect of the present invention, wherein said condensation-capacity detection means is medium-temperature detection means of detecting the temperature of said heat transport medium coming into said condenser or medium-temperature detection means of detecting the temperature of said heat transport medium going out of said condenser.

In the case of a sixth aspect of the present invention, when the entrance temperature of a heat transport medium incoming into a condenser or the exit temperature of a heat transport medium outgoing from the condenser is equal to or lower than a predetermined temperature, the output of circulation means is controlled by control means to store the exhaust heat of a fuel cell in heat-using means by assuming that a condensation capacity is sufficient. Moreover, when the entrance temperature or exit temperature is equal to or higher than the predetermined temperature, the circulation means is stopped to complete exhaust-heat recovery by assuming that the condensation capacity is deteriorated.

A seventh aspect of the present invention is the fuel-cell power-generation system according to the third aspect of the invention, wherein said condensation-capacity detection means is heat-using-temperature detection means of detecting the temperature of said heat-using means.

In the case of a seventh aspect of the present invention, when the temperature detected by heat-using temperature detecting means is equal to or lower than a predetermined temperature, the output of the circulation means is continuously controlled by control means and stored in the heat-using means of a fuel cell by assuming that a condensation capacity is sufficient. Moreover, when the temperature detected by the heat-using temperature detecting means is equal to or higher than the predetermined temperature, the circulation means is stopped by the control means to complete exhaust heat recovery by assuming that the condensation capacity is deteriorated.

An eighth aspect of the present invention is the fuel-cell power-generation system according to the third aspect of the present invention, wherein said condensation-capacity detection means is medium-temperature detection means of detecting the temperature of said heat transport medium recovering exhaust heat in said heat exchange means.

In the case of the eighth aspect of the present invention, the output value of circulation means is obtained by using the temperature of a heat-transport medium detected by medium-temperature detection means. When the output value of the circulation means is equal to or less than a predetermined value, the output of the circulation means is continuously controlled by control means and stored in the heat-using means of a fuel cell by assuming that a condensation capacity is sufficient. However, when the output value to the circulation means is equal to or more than the predetermined value, assuming that a condensation capacity is lowered, the circulation means is stopped by the control means to complete exhaust heat recovery A ninth aspect of the present invention is the fuel-cell power-generation system according to the first aspect of the present invention, wherein the unused exhaust gas to be condensed by said condenser is at least either of an oxidant gas and a fuel gas.

A tenth aspect of the present invention is the fuel-cell power-generation system according to the first aspect of the present invention, wherein cooling is continued until the temperature of said fuel cell becomes a predetermined threshold value or less even after supply of fuel and oxidant to said fuel cell is stopped.

An eleventh aspect of the present invention is the fuel-cell power-generation system according to the first aspect of the present invention, further comprising:

a cooling-circulation system through which a first heating medium set, so as to pass through said fuel cell and to carry the heat of said fuel cell, circulates;

heating-medium circulation means of circulating said first heating medium through said cooling-circulation system;

heat release means of releasing the heat of said first heating medium; and temperature detection means of directly or indirectly detecting the temperature of said fuel cell, and said heat-medium circulation means operates at least until the temperature detected by said temperature detection means becomes a predetermined threshold value or less after supply of fuel and oxidant to said fuel cell is stopped.

A twelfth aspect of the present invention is the fuel-cell power-generation system according to the eleventh aspect of the present invention, wherein said heat release means has a heat exchanger of performing heat exchange between said first heating medium and a second heating medium, and said heat exchanger performs said heat exchange until the temperature detected by said temperature detection means becomes a predetermined threshold value or less after supply of said fuel and said oxidant to said fuel cell is stopped.

A thirteenth aspect of the present invention is the fuel-cell power-generation system according to the eleventh or the twelfth aspect of the present invention, wherein the temperature detected by said temperature detection means is the temperature of said first heating medium or said cooling-circulation system.

A fourteenth aspect of the present invention is the fuel-cell power-generation system according to the twelfth aspect of the present invention, wherein the temperature detected by said temperature detection means is the temperature of said second heating medium.

A fifteenth aspect of the present invention is a fuel-cell power-generation system, comprising:

a fuel cell of generating power by receiving supply of a fuel and an oxidant;

a cooling-circulation system through which a first heating medium set, so as to pass through said fuel cell and to carry the heat of said fuel cell, circulates;

heating-medium circulation means of circulating said first heating medium in said cooling-circulation system;

heat release means of heat-exchanging the heat of said first heating medium with a second heating medium; and heat detection means of detecting the temperature of said second heating medium, and at least either of said heating-medium circulation means and said heat release means continuously operates until the temperature detected by said temperature detection means becomes a predetermined threshold value or less even after supply of said fuel and said oxidant to said fuel cell is stopped.

DESCRIPTION OF SYMBOLS

Figure 1:
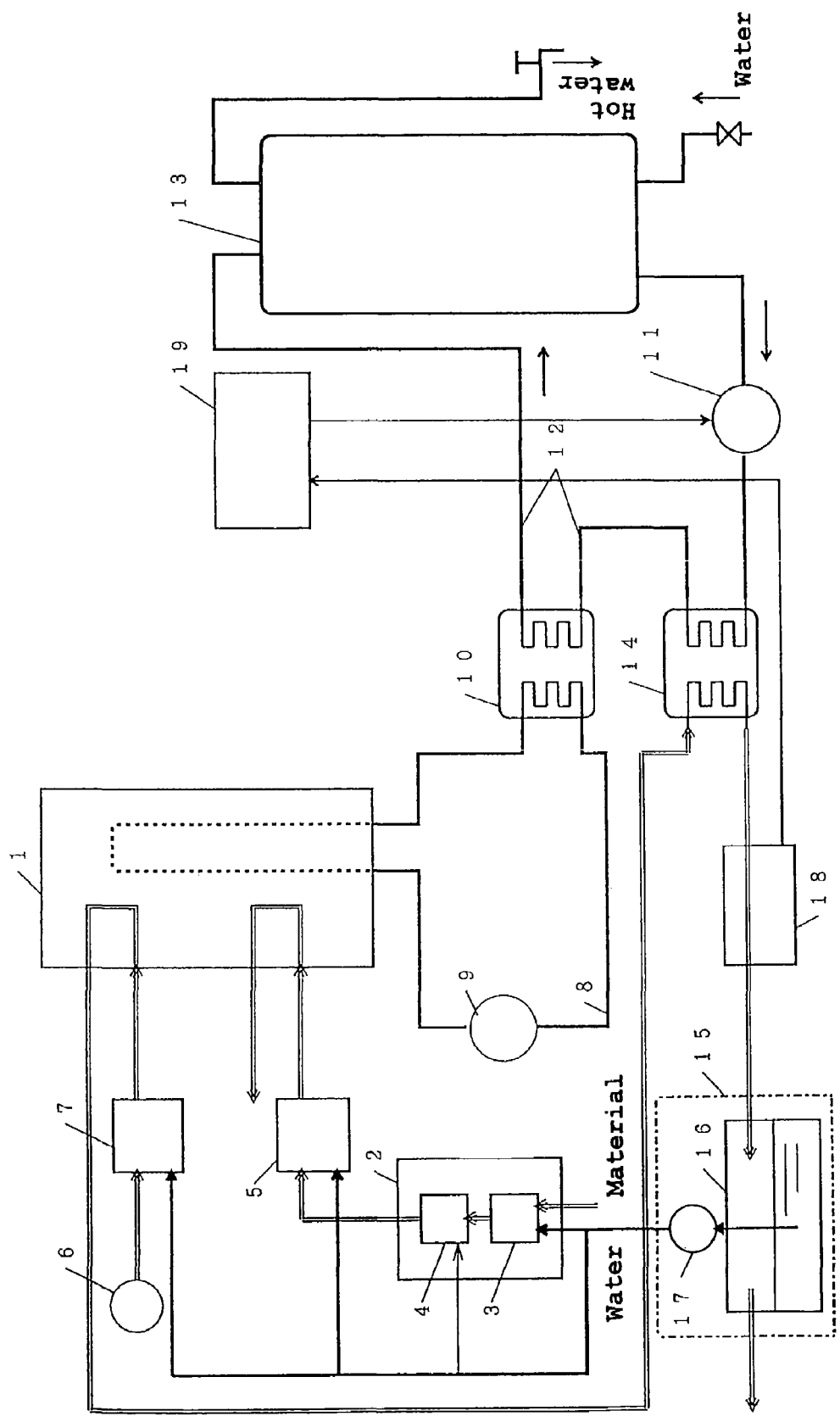
FIG. 1 is a block diagram of a fuel-cell power-generation system of embodiment 1 of the present invention.

1 Fuel cell
10 Heat exchange means
11 Heat-transport-medium circulation means
13 Heat-using means
14 Condenser
15 Water-using means
18 Condensation-capacity detection means
19 Control means
32 Fuel generator
33 Blower
34 Cooling pipe
35 Cooling-water pump
36 Heat exchanger
37 Hot-water storage tank
38 City-water pipe
39 City-water pump
310 Fuel-cell-temperature detector
311 City-water-temperature detector
100 Cooling system

BEST MODE FOR CARRYING OUT THE INVENTION

Embodiments of the present invention are described below by referring to the accompanying drawings.

Embodiment 1

FIG. 1 is a block diagram of a fuel-cell power-generation system of embodiment 1 of the present invention.

Figure 9:
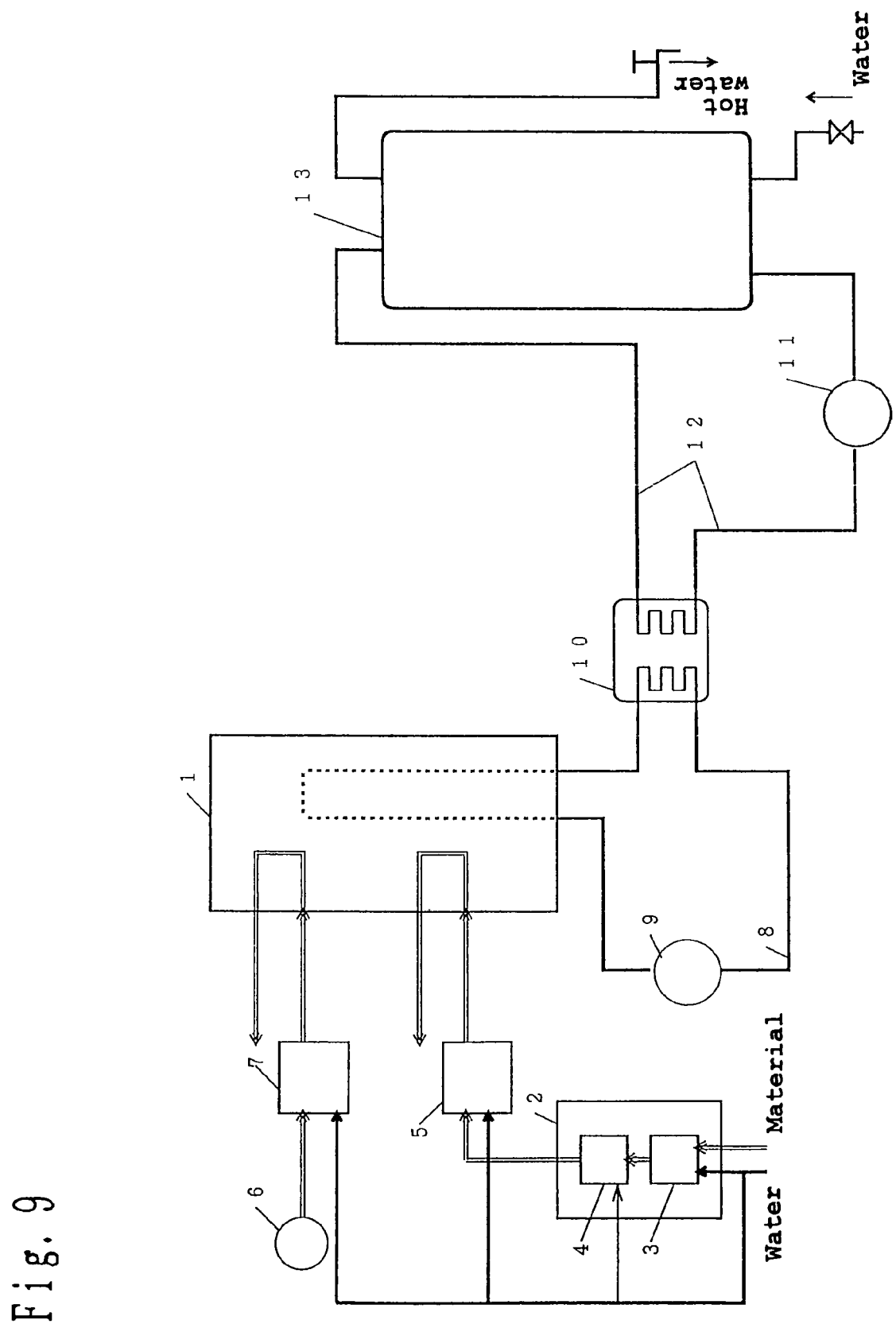
FIG. 9 is a block diagram of a conventional fuel-cell power-generation system.

In FIG. 1, components having the same functions as the power generation system using the conventional fuel cell shown in FIG. 9 are provided with the same symbol and descriptions of details of the functions are omitted by assuming that the functions conform to those in FIG. 9.

Symbol 14 denotes a condenser of condensing and heat-exchanging the water vapor contained in an unused exhaust gas (oxidant gas) exhausted from a fuel cell 1, 15 denotes water-using means of water-vapor-reforming the condensed water discharged from the condenser 14 by the reformer 3 of the fuel treater 2, making carbon monoxide in a reformed gas react with water by the carbon-monoxide shifter 4 to produce carbon dioxide and hydrogen, and humidifying the fuel gas to be supplied to the fuel cell 1 by the fuel-side humidifier 5 and the supplied air by the oxidation-side humidifier 7 respectively. The water-using means 15 is constituted by a condensed-water tank 16 of storing condensed water, and a condensed-water pump 17 of supplying condensed water to the fuel treater 2, fuel-side humidifier 5, and air-side humidifier 7.

Symbol 18 denotes condensation-capacity detection means of detecting the condensation capacity of the condenser 14, which always monitors the quantity of condensed water for unit time from the condenser 14.

Symbol 19 denotes control means of controlling the output of heat-transport-medium circulation means (hereafter referred to as circulation pump 11) and thereby controlling the quantity of circulation water of a heat transport medium (circulation water), making heat-using means (hereafter referred to as hot-water storage tank) 13 recover the exhaust heat of the fuel cell 1 through the exhaust-heat recovery pipe 12, and receiving a condensation-capacity detection signal of the condensation-capacity detection means 18.

Then, operations and functions are described below.

When the fuel-cell power-generation system operates (generates power), it circulates the heat generated by the fuel cell 1 during power generation as cooling water through the pump 9 and makes the heat transport medium (circulation water of city water stored in the hot-water storage tank 13) flowing through the exhaust-heat recovery pipe 12 heat-carry the heat by the heat exchange means 10.

Moreover, an oxidant gas is humidified by the oxidation-side humidifier 7 by the air feeder 6 and supplied to the fuel cell 1. The unused gas not contributing to the power generation by the fuel cell 1 is heat-exchanged with a heat transport medium (circulation water of city water) flowing through the exhaust-heat recovery pipe 12 by the condenser 14 similarly to the case of the heat exchange means 10, and the water is condensed and recovered in the condensed-water tank 16 of the water-using means 15 as condensed water.

The control means 19 receives a condensation-capacity detection signal from the condensation-capacity detection means 18. When the condensation capacity of the condenser 14 is equal to or more than a predetermined value, that is, when the quantity of high-temperature water due to exhaust-heat recovery supplied to the hot-water storage tank 13 is small, or the temperature of the circulation water supplied from the hot-water storage tank 13 to the condenser 14 is low, the control means 19 controls the output of the circulation pump 11 and recovers the exhaust heat of the fuel cell 1 through the exhaust-heat recovery pipe 12.

In the case of exhaust heat recover, the dew point of the unused gas exhausted from the fuel cell 1 is lower and the heat capacity of the unused gas exhausted from the fuel cell 1 is smaller, compared with the temperature of the cooling water in the cooling pipe 8 which is almost equal to the operating temperature of the fuel cell 1 under power generation (approx. 70° to 80° C. for a polymer electrolytic fuel cell) and the heat capacity of the cooling water. Therefore, heat exchange of the circulation water from the hot-water storage tank 13 is performed in order of the condenser 14 first and then heat exchange means 10.

Then, when the condensation capacity of the condenser 14 is equal to or less than a predetermined value, that is, when the quantity of high-temperature water due to exhaust heat recover to the hot-water storage tank 13, or when the quantity of hot water in the hot-water storage tank 13 increases and the circulation water incoming into the condenser 14 has a high temperature, the control means 19 detects that a condensation-capacity detection signal output from the condensation-capacity detection means 18 becomes a predetermined value or less, confirms that the recovered quantity of condensed water is decreased due to reduction of the condensation capacity of the condenser 14, and stops the power generation and exhaust-heat recovery by the fuel cell 1.

Therefore, the condenser 14 condenses the unused exhaust gas exhausted from the fuel cell 1 to recover water, the condensation-capacity detection means 18 always monitors the condensation capacity of the condenser, and the control means 19 controls the output of the circulation pump 11 to store the exhaust heat of the fuel cell 1 when sufficiently having a condensation capacity and stops the circulation pump 11 and completes exhaust-heat recovery when the condensation capacity lowers.

Therefore, water can be self-supported without taking in water from the outside by using the recovered water obtained by condensing the water for humidifying supplied air by the condenser 14 for the water for reformation and shift to the reformer 3 and carbon-monoxide shifter 4 of the fuel treater 2, supplied gas at the fuel-side humidifier 5 and oxidation-side humidifier 7.

Moreover, it is possible to prevent the reformation catalyst and shift catalyst stored respectively in the reformer 3 and carbon-monoxide shifter 4 of the fuel treater 2 from deteriorating caused by chlorine ions in case of supplying water (general water) from outside. Furthermore, it is possible to prevent a fuel cell from a trouble from occurring in power generation by a fuel cell caused by the fact that a fuel gas or oxidant gas is ionized and its electric conductivity is raised. Furthermore, it is possible to reduce the frequency of regular maintenance of ion removal means or eliminate the need of abolish the maintenance by greatly reducing ion removal means such as ion exchange resin of removing chlorine ions from general water such as city water or preventing the ion removal capacity proportionate to operating time from deteriorating. However, to realize the above mentioned, it is necessary to previously store high-purity water in the condensed-water tank 16.

In the case of the fuel-cell power-generation system of this embodiment, humidified exhaust gas having 60° to 65° C. as the temperature of unused exhaust gas after chemically reacting in the fuel cell 1 under operation is obtained and a temperature rise of approx. 15° to 20° C. is obtained when the flow rate of a heat transport medium is set to 0.8 to 1.0 L/min when heat-exchanging the heat transport medium with water by the condenser 14. After performing heat exchange by the condenser 14, by performing heat exchange by the heat exchange means 10, it is possible to raise the temperature up to approx. the cooling-water circulation temperature (70° to 80° C.). Therefore, the exhaust-heat recover efficiency of the fuel cell 1 is further improved.

Moreover, in the case of the above embodiment, the condenser 14 is constituted so as to condense only an oxidant gas among unused exhaust gases of the fuel cell 1. However, it is needless to say that the same advantage can be also obtained by adding a configuration of condensing the unused exhaust gas of a fuel gas. It is also allowed to condense only the fuel gas.

Furthermore, it is allowed to set an ion exchange resin to the water-using means 15 and improve the purity of the water to be supplied from the condensed-water tank 16 to the fuel treater 2, fuel-side humidifier 5, and oxidation-side humidifier 7 by using the ion exchange resin. In this case, it is possible to set the ion exchange resin to the downstream side of the condensed-water pump 17. By using the ion exchange resin as described above, an advantage is obtained that high-purity water is supplied to the fuel treater 2, fuel-side humidifier 5, and oxidation-side humidifier 7 even if city water must be really and slightly supplied to the condensed-water tank 16 at need.

Embodiment 2

Figure 2:
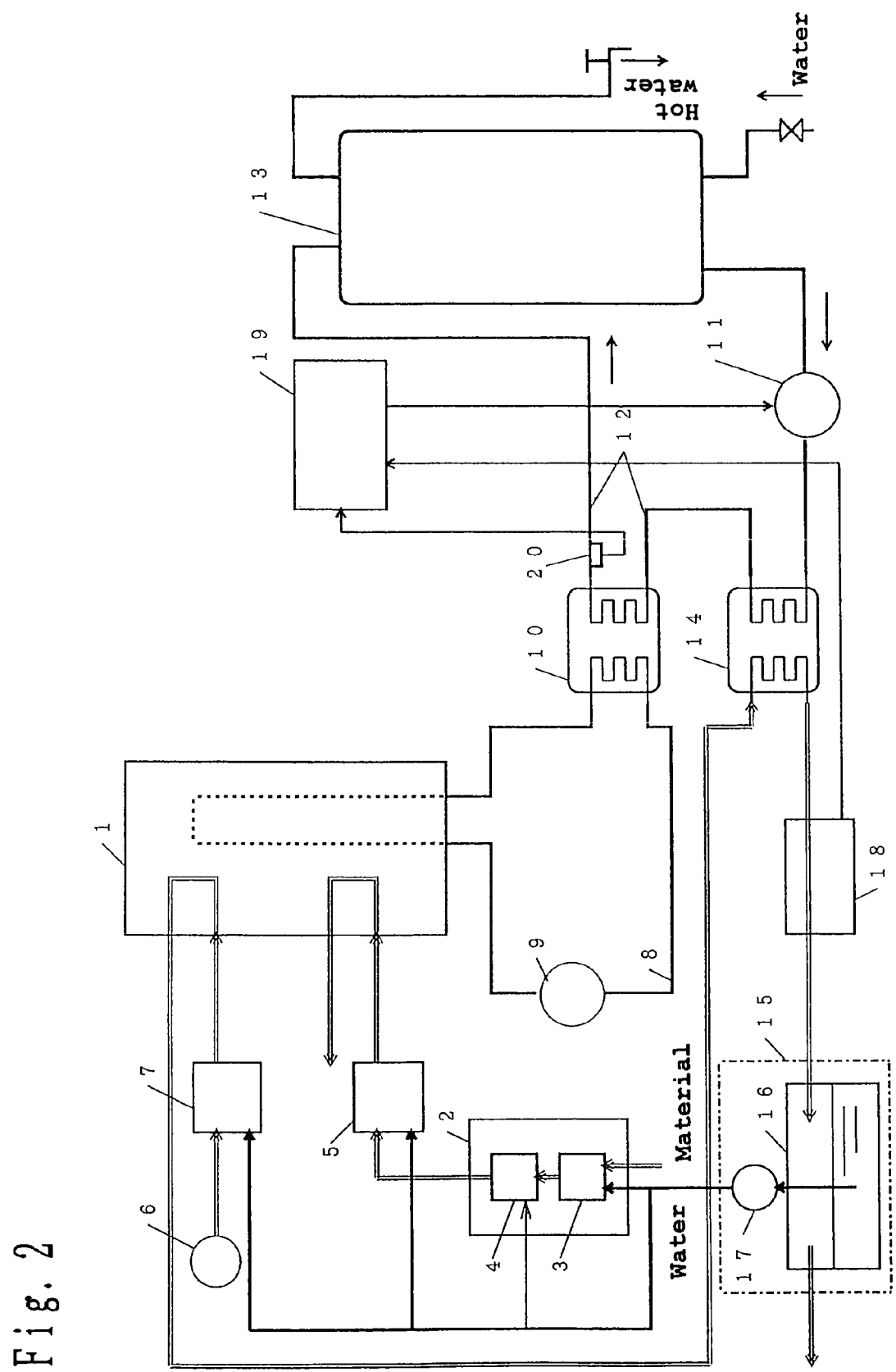
FIG. 2 is a block diagram of a fuel-cell power-generation system of embodiment 2 of the present invention.

FIG. 2 is a block diagram of a fuel-cell power-generation system of embodiment 2 of the present invention. In FIG. 2, components having functions same as those of the conventional fuel-cell power-generation system shown in FIG. 9 and the fuel-cell power-generation system of the embodiment 1 shown in FIG. 1 are provided with the same symbol and descriptions of details of those functions are omitted by assuming that the functions conform to those described for FIGS. 9 and 1.

Symbol 20 denotes exhaust-heat-recovery-temperature detection means of detecting the temperature of a heat transport medium at the exit of an exhaust-heat recovery pipe 12 connected to heat exchange means 10 so as to output the exhaust-heat recovery temperature for a hot-water storage tank 13 to control means 19.

Then, operations and functions are described below.

When the fuel-cell power-generation system operates (generates power), the heat generated by a fuel cell 1 during power generation is circulated as cooling water through a pump 9 and the heat exchange means 10 makes a heat transport medium (circulation water of city water stored in the hot-water storage tank 13) flowing through an exhaust-heat recover pipe 12 carry the heat.

Moreover, an oxidant gas is humidified in an oxidation-side humidifier 7 by an air feeder 6 and supplied to a fuel cell 1. The unused gas not contributing to the power generation by the fuel cell 1 is heat-exchanged with a heat transport medium (circulation water of city water) flowing through the exhaust-heat recovery pipe 12 by a condenser 14 similarly to the case of the heat exchange means 10, and moisture is condensed and recovered in a condensed-water tank 16 of water-using means 15 as condensed water.

The control means 19 receives a condensation-capacity detection signal from condensation-capacity detection means 18 and when the condensation capacity of the condenser 14 is equal to or more than a predetermined value, that is, when the quantity of high-temperature water due to exhaust-heat recovery to the hot-water storage tank 13 is small, or when the temperature of circulation water coming into the condenser 14 from the hot-water storage tank 13 is low, controls the output of a circulation pump 11 so that the exhaust-heat recovery temperature by exhaust-heat-recovery-temperature detection means 20 becomes a predetermined value (60° to 80° C. in the case of a polymer electrolytic fuel cell), and recovers the exhaust heat of the fuel cell 1 through the exhaust-heat recovery pipe 12. That is, hot water is stored in a laminated state at a predetermined stored hot-water temperature (60° to 80° C.) from the upper portion of the hot-water storage tank 13.

In the case of exhaust heat recovery, because the dew point and heat capacity of the unused gas exhausted from the fuel cell 1 are lower and smaller respectively than the temperature and heat capacity of the cooling water in a cooling pipe 8 almost equal to the operating temperature (70° to 80° C. in the case of a polymer electrolytic fuel cell) of the fuel cell 1 under power generation, heat exchange of the circulation water supplied from the hot-water storage tank 13 is executed in order of the condenser 14 and heat exchange means 10.

Then, when the condensation capacity of the condenser 14 becomes a predetermined value or less, that is, the quantity of high-temperature water due to exhaust heat recovery to the hot-water storage tank 13 increases, or when the quantity of hot water stored in the hot-water storage tank 13 becomes almost full and the circulation water coming into the condenser 14 has a high temperature, the control means 19 receives that a condensation-capacity detection signal output from the condensation-capacity detection means 18 becomes a predetermined value or less, and confirms that hot-water storage due to exhaust heat recovery to the hot-water storage tank 13 is almost completed and a storage volume of condensed water is lowered by the drop of condensation capacity of the condenser 14, and then stops the output of the circulation pump 11 and the power generation and exhaust heat recovery by the fuel cell 1.

Therefore, the condenser 14 condenses the unused exhaust gas exhausted from the fuel cell 1 to recover water, the condensation-capacity detection means 18 always monitors the condensation capacity of the condenser 14, the control means 19 controls the output of the circulation pump 11 and stores the exhaust heat of the fuel cell 1 in the hot-water storage tank 13 when a sufficient condensation capacity is left, and stops the circulation pump 11 to complete exhaust heat recovery when the condensation capacity decreases.

Therefore, water can be self-supported without taking in water from the outside by using the recovered water obtained by condensing the water by the condenser 14 for the water for reformation and shift to be supplied to the reformer 3 and carbon-monoxide shifter 4 of the fuel treater 2 and for the water for humidifying supplied air and supplied gas at the fuel-side humidifier 5 and the oxidation-side humidifier 7.

Moreover, it is possible to prevent the reformation catalyst and shift catalyst stored respectively in the reformer 3 and carbon-monoxide shifter 4 of the fuel treater 2 from being deteriorated due to chlorine ions when supplying water (city water) from the outside or metallic ions eluted from a pipeline. Furthermore, it is possible to prevent a trouble from occurring in power generation by a fuel cell caused by the fact that a fuel gas or oxidant gas is ionized and electric conductivity is raised. Furthermore, it is possible to reduce the frequency of regular maintenance of ion removal means or eliminate the need of the maintenance by greatly decreasing the level of ion removal means such as ion exchange resin for removing chlorine ions from general water such as city water in a fuel-gas supply system and oxidant-gas supply system or by reducing deterioration of ion removal capacity proportionate to work time. To realize the abovementioned, it is necessary to previously store high-purity water in the condensed-water tank 16.

Furthermore, because the exhaust-heat-recovery-temperature detection means 20 controls an exhaust-heat recovery temperature so that it becomes a predetermined temperature and the control means 19 controls the output of the circulation pump 11, it is possible to store hot water in the hot-water storage tank 13 in a laminated state from the upper portion. Therefore, it is always possible to keep stored hot water at a high temperature (60° to 80° C.) in the normal hot-water-supply-pipe configuration in which a hot-water-supply-pipe opening is formed on the upper portion of the hot-water storage tank 13, and even when the hot water in the hot-water storage tank 13 is entirely exhausted, it is possible to secure the necessary minimum quantity of hot water through short-time power generation compared to the case of a system of uniformly storing hot water in the whole hot-water storage tank 13.

Moreover, in the case of the fuel-cell power-generation system of this embodiment, humidified exhaust gas air of 60° to 65° C. is obtained as the temperature of unused exhaust gas after chemical reaction with the fuel cell 1 while the fuel cell is operated and when heat-exchanging the air with water serving as a heat transport medium by the condenser 14, a temperature rise of 15° to 20° C. is obtained when keeping the flow rate of the heat transport medium at 0.8 to 1.0 L/min.

After performing heat exchange by the condenser 14, by further performing heat exchange by the heat exchange means 10, it is possible to raise the temperature up to the vicinity of a cooling-water circulation temperature (70° to 80° C.). Therefore, the exhaust-heat recovery efficiency of the fuel cell 1 is further improved.

Furthermore, in the case of the above embodiment, the condenser 14 is constituted so as to condense only the oxidant gas among unused exhaust gases of the fuel cell 1. However, it is needless to say that the same advantage can be obtained by additionally using a configuration of condensing the unused exhaust gas of a fuel gas. Moreover, it is allowed to condense only a fuel gas.

Embodiment 3

Figure 3:
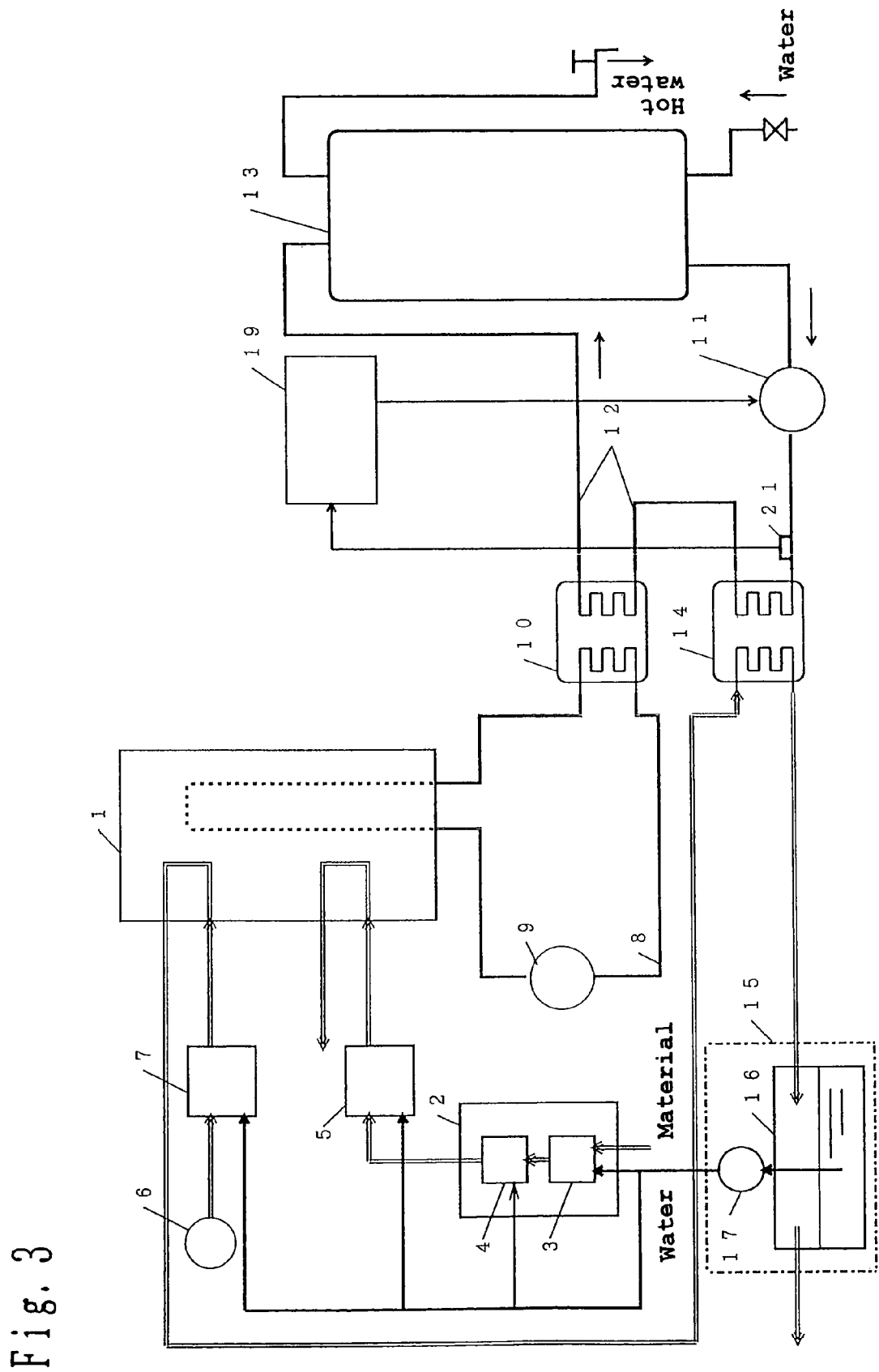
FIG. 3 is a block diagram of a fuel-cell power-generation system of embodiment 3 of the present invention.

FIG. 3 is a block diagram of a fuel-cell power-generation system of embodiment 3 of the present invention.

In FIG. 3, components having the same functions as those of the conventional fuel-cell power-generation system shown in FIG. 9 and the fuel-cell power-generation system of the embodiment 1 shown in FIG. 1 are provided with the same symbol. Descriptions of details of those functions are omitted by assuming that the functions conform to those shown in FIGS. 9 and 1.

Symbol 21 denotes condensation-capacity detection means of detecting the condensation capacity of a condenser 14, which is a thermistor serving as condenser-temperature detection means of detecting the entrance temperature of a heat transport medium to the condenser 14.

Then, operations and functions are described below.

When the fuel-cell power-generation system operates (generates power), the heat due to power generation by a fuel cell 1 is circulated as cooling water through a pump 9 and heat-exchange means 10 makes a heat transport medium (circulation water of city water stored in a hot-water storage tank 13) flowing through an exhaust-heat recovery pipe 12 carry heat.

Moreover, an oxidant gas is humidified by an oxidation-side humidifier 7 and supplied to the fuel cell 1 by an air feeder 6. The unused gas not contributing to the power generation by the fuel cell 1 is heat-exchanged with a heat transport medium (circulation water of city water) flowing through the exhaust-heat recovery pipe 12 by means of the condenser 14 similar to the case of the heat exchange means 10, and moisture is condensed and recovered by a condensed-water storage tank 16 of water-using means 15 as condensed water.

The control means 19 receives a condensation-capacity detection signal (condenser entrance temperature of heat transport medium) from condenser-temperature detection means 21 and when the entrance temperature is sufficiently lower than the exhaust-gas temperature (60° to 65° C.), that is, when the quantity of high-temperature water due to exhaust heat recovery to the hot-water storage tank 13 is small, determines that the condensation capacity of the condenser 14 is equal to or more than a predetermined value, controls the output of a circulation pump 11, and recovers the exhaust heat of the fuel cell 1 through the exhaust-heat recovery pipe 12.

Then, when the condensation capacity of the condenser 14 is equal to or less than a predetermined value, that is, when the quantity of high-temperature water due to exhaust-heat recovery to the hot-water storage tank 13 increases, the condensation-capacity detection signal (condenser entrance temperature of heat transport medium) of the condenser-temperature detection means 21 becomes a predetermined value or more and the control means 19 confirms that the quantity of recovered condensed water is decreased due to deterioration of the condensation capacity of the condenser 14, stops the output of the circulation pump 11, and stops the power generation and exhaust heat recovery by the fuel cell 1.

Therefore, the condenser 14 condenses the unused exhaust gas exhausted from the fuel cell 1 to recover water, and simultaneously the condenser-temperature detection means 21 always monitors the condensation capacity of the condenser 14, the control means 19 controls the output of the circulation pump 11 to store the exhaust heat of the fuel cell 1 in the hot-water storage tank 13 when a sufficient condensation capacity is left, and stops the circulation pump 11 to complete the exhaust-heat recovery when the condensation capacity is decreased.

Therefore, functions and advantages same as those of the embodiment 1 are obtained.

Moreover, by applying the embodiment 3 to the embodiment 2, functions and advantages same as those of the embodiment 2 are obtained.

Furthermore, because the condenser-temperature detection means can be realized by a simple configuration such as adding a thermistor to the entrance of the condenser 14, it is possible to downsize and rationalize the fuel-cell power-generation system.

In the case of the above embodiment, the condenser-temperature detection means of detecting the condensation capacity of the condenser 14 is constituted so as to detect the entrance temperature of the heat transport medium to the condenser 14. However, it is needless to say that the same advantage is obtained by using a configuration of detecting the exit temperature of the heat transport medium of the condenser 14.

Embodiment 4

Figure 4:
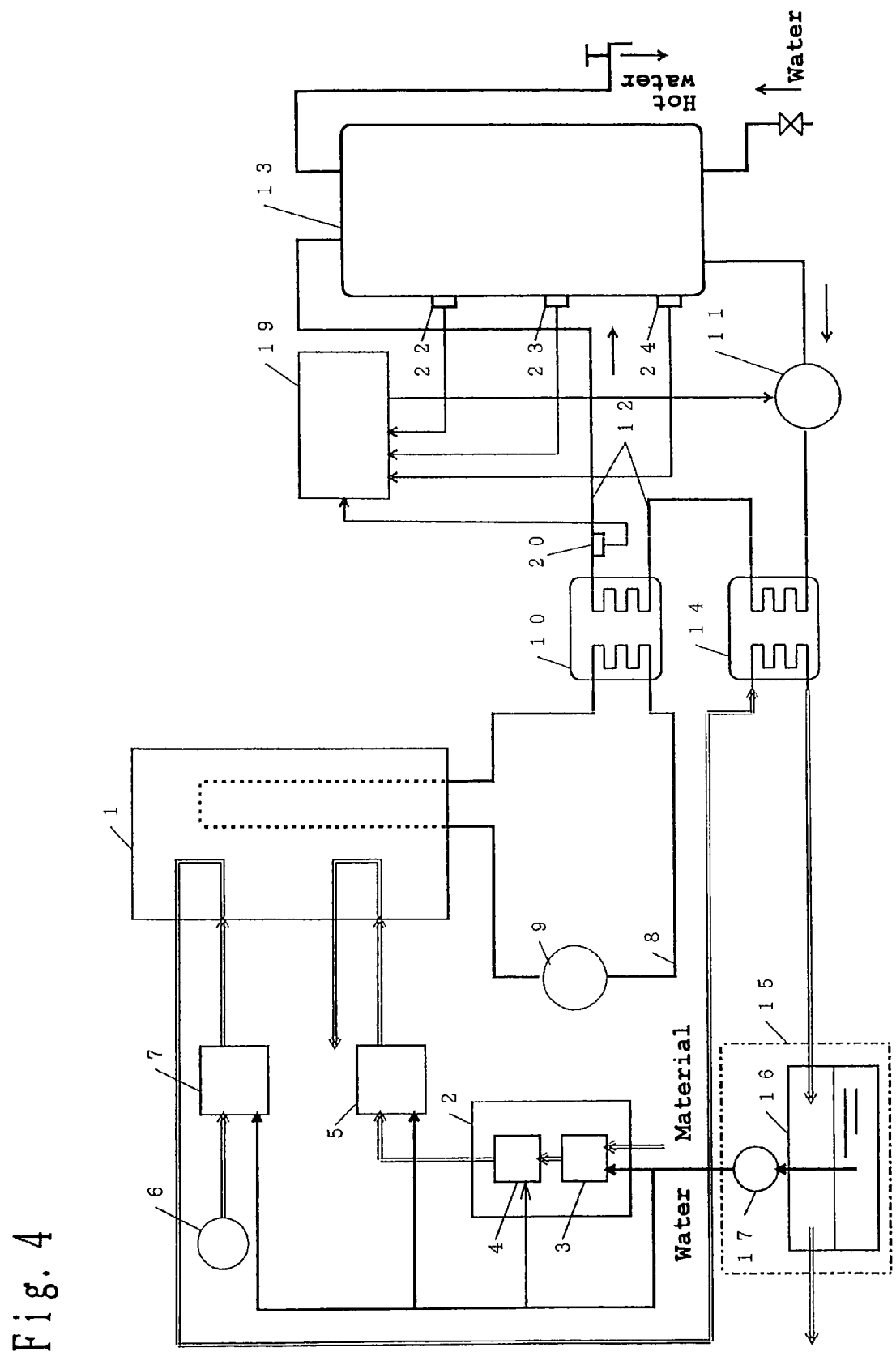
FIG. 4 is a block diagram of a fuel-cell power-generation system of embodiment 4 of the present invention.

FIG. 4 is a block diagram of a fuel-cell power-generation system of embodiment 4 of the present invention.

In FIG. 4, components having the same functions as those of the conventional fuel-cell power-generation system shown in FIG. 9 and the fuel-cell power-generation system of the embodiment 1 shown in FIG. 1 are provided with the same symbol and descriptions of details of those functions are omitted by assuming that the functions conform to those in FIGS. 9 and 1.

Symbols 22, 23, and 24 denote condensation-capacity detection means of respectively detecting the condensation capacity of a condenser 14 and are thermistors serving as a plurality of heat-using-temperature detection means provided to confirm a stored-heat-temperature distribution due to exhaust heat recovery by a hot-water storage tank 13.

Then, operations and functions are described below.

When the fuel-cell power-generation system operates (generates power), it circulates the heat generated by a fuel cell 1 during power generation as cooling water through a pump 9 and heat exchange means 10 makes a heat transport medium (circulation water of city water stored in a hot-water storage tank 13) flowing through an exhaust-heat recovery pipe 12 carry heat.

Moreover, by means of the air feeder 6 an oxidant gas is humidified by an oxidation-side humidifier 7 and supplied to the fuel cell 1. The unused gas not contributing to the power generation by the fuel cell 1 is heat-exchanged with a heat transport medium (circulation water of city water) flowing through an exhaust-heat recovery pipe 12 by a condenser 14 as is the case of the heat exchange means 10, and moisture is condensed and recovered as condensed water by a condensed-water tank 16 of water-using means 15.

Control means 19 receives a stored-heat-temperature-distribution detection signal from heat-using-temperature detection means 22, 23, or 24 and when the condensation capacity of the condenser 14 is equal to or more than a predetermined value, that is, when the quantity of high-temperature water due to exhaust heat recovery to a hot-water storage tank 13 is small (when the detection temperature of the heat-using-temperature detection means 24 closest to the circulation-water suction port of the exhaust-heat recovery pipe 12 among the heat-using-temperature detection means 22, 23, and 24 is equal to or lower than a predetermined value), controls the output of a circulation pump 11 and recovers exhaust heat of the fuel cell 1 through the exhaust-heat recovery pipe 12.

Then, when the condensation capacity of the condenser 14 is equal to or less than a predetermined value, that is, the quantity of high-temperature water due to the exhaust heat recovery to the hot-water storage tank 13 increases (when the detection temperature of the heat-using-temperature detection means 24 closest to the circulation-water suction side of the exhaust-heat recovery pipe 12 among the heat-using-temperature detection means 22, 23, and 24 is equal to or higher than a predetermined value), the control means 19 estimates deterioration of the condensation capacity of the condenser 14 (decrease in the quantity of recovered condensed water) due to a rise of the circulation-water temperature of the exhaust-heat recovery pipe 12, stops the output of the circulation pump 11, and stops the power generation and exhaust heat recovery by the fuel cell 1.

Therefore, the condenser 14 condenses the unused exhaust gas exhausted from the fuel cell 1 and recovers water, the heat-using-temperature detection means 22, 23, and 24 always monitor the condensation capacity of the condenser 14, and the control means 19 controls the output of the circulation pump 11 and stores the exhaust heat of the fuel cell 1 in the hot-water storage tank 13 when a sufficient condensation capacity is left and stops the circulation pump 11 to complete the exhaust heat recovery when the condensation capacity is deteriorated.

Therefore, functions and advantages same as those of the embodiment 1 can be obtained.

Moreover, by applying the embodiment 4 to the embodiment 2, functions and advantages same as those of the embodiment 2 are obtained.

Furthermore, because the condenser-temperature detection means can be also used as a thermistor serving as the heat-using-temperature detection means of confirming the stored-heat temperature distribution of the heat-using means (hot-water storage tank), it is possible to downsize and rationalize the fuel-cell power-generation system.

Embodiment 5

Figure 5:
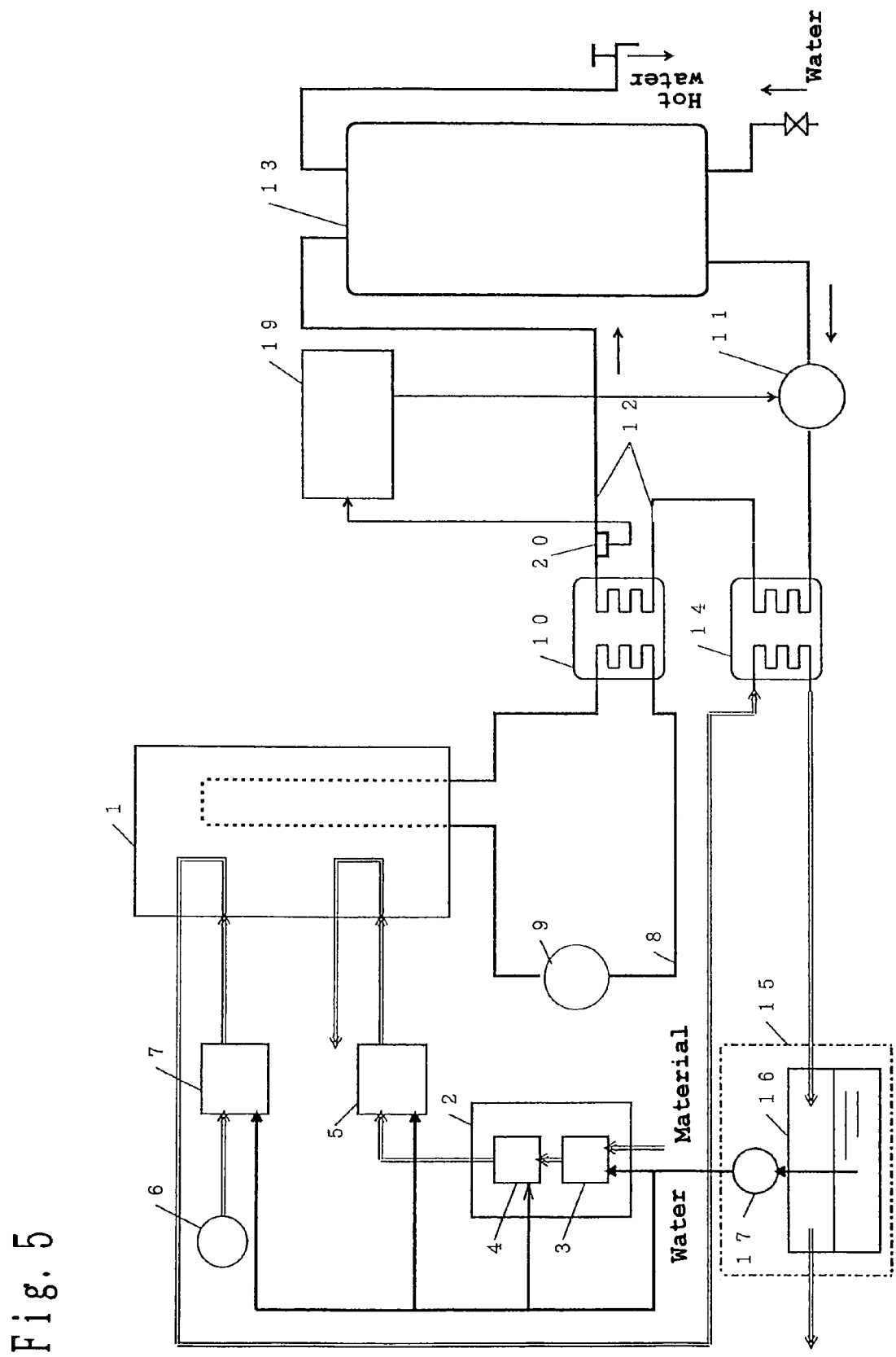
FIG. 5 is a block diagram of a fuel-cell power-generation system of embodiment 5 of the present invention.

FIG. 5 is a block diagram of a fuel-cell power-generation system of embodiment 5 of the present invention.

In FIG. 5, components having the same functions as those of the conventional fuel-cell power-generation system shown in FIG. 9 and the fuel-cell power-generation system of the embodiment 2 shown in FIG. 2 are provided with the same symbol and descriptions of details of those functions are omitted by assuming that the functions conform to those in FIGS. 9 and 2.

Because control means 19 receives an exhaust-heat recovery temperature from exhaust-heat-recovery-temperature detection means 20 of detecting the temperature of a heat transport medium at the exit side of an exhaust-heat recovery pipe 12 connected to heat exchange means 10 and controls the output of a circulation pump 11 so that an exhaust-heat temperature becomes a predetermined value (60° to 80° C.), condensation-capacity detection means is constituted so as to detect a condensation capacity by using the fact that a value output to the circulation pump 11 correlates with a circulation-water temperature at the suction side of the circulation pump 11 of the exhaust-heat recovery pipe 12. That is, when a condensation capacity is high, the temperature of a condenser 14 at the heat-transport medium side is sufficiently lower than the temperature of the condenser 14 at the exhaust gas side. Thus, to keep the above exhaust-heat recovery temperature at a predetermined value (60° to 80° C.), the circulation pump 11 slowly rotates. However, when a condensation capacity is low, the temperature of the condenser 14 at the heat-transport medium side is not sufficiently lower but higher than the temperature of the condenser 14 at the exhaust-gas side. Therefore, the circulation pump 11 quickly rotates in order to keep the above exhaust-heat recover temperature at the predetermined value (60° to 80° C.)

Therefore, by checking the rotational-speed command to the circulation pump 11, a condensation capacity can be obtained.

Then, operations and functions are described below.

When the fuel-cell power-generation system operates (generates power), it circulates the heat generated by a fuel cell 1 during power generation as cooling water through a pump 9 and the heat exchange means 10 makes a heat transport medium (circulation water of city water stored in a hot-water storage tank 13) carry heat.

Moreover, an oxidant gas is humidified by an oxidation-side humidifier 7 and supplied to the fuel cell 1 by an air feeder 6. The unused gas not contributing to the power generation by the fuel cell 1 is heat-exchanged with a heat transport medium (circulation water of city water) flowing through the exhaust-heat recovery pipe 12 by the condenser 14 as is the case of the heat exchange means 10, and moisture is condensed and recovered by the condensed-water tank 16 of water-using means 15 as condensed water.

The control means 19 receives an exhaust-heat recovery temperature from the exhaust-heat-recovery-temperature detection means 20 of detecting the temperature of a heat transport medium at the exit side of the exhaust-heat recovery pipe 12 and when the condensation capacity of the condenser 14 is equal to or more than a predetermined value, that is, when the quantity of high-temperature water due to exhaust heat recovery to the hot-water storage tank 13 is small, or the output value of the circulation pump 11 to be output so that an exhaust-heat recovery temperature is always kept at a predetermined temperature (60° to 80° C.) is equal to or less than a predetermined value, controls the output of the circulation pump 11, and recovers exhaust heat of the fuel cell 1 through the exhaust-heat recovery pipe 12.

Then, when the condensation capacity of the condenser 14 becomes a predetermined value or less, that is, when the quantity of high-temperature water due to exhaust-heat recovery to the hot-water storage tank 13 increases, or when the output value of the circulation pump 11 to be output so that an exhaust-heat recovery temperature is always kept at a predetermined temperature (60° to 80° C.) is equal to or more than a predetermined temperature, the control means 19 estimates deterioration of the condensation capacity of the condenser 14 due to a rise of the circulation-water temperature (decrease of quantity of recovered condensed water) of the exhaust-heat recovery pipe 12, stops the output of the circulation pump 11, and stops the power generation and exhaust heat recovery by the fuel cell 1.

Therefore, the condenser 14 condenses the unused exhaust gas exhausted from the fuel cell 1 to recover water and receives an exhaust-heat recovery temperature from the exhaust-heat-recovery-temperature detection means 20, the control means 19 of controlling the output of the circulation pump 11 always monitors the condensation capacity of the condenser 14, and the control means 19 controls the output of the circulation pump 11 and stores the exhaust heat of the fuel cell 1 in the hot-water storage tank 13 when a sufficient condensation capacity is left and stops the circulation pump 11 to complete exhaust heat recovery when the condensation capacity lowers.

Therefore, functions and advantages same as those of the embodiment 2 are obtained.

Moreover, the exhaust-heat-temperature detection means 20 makes it possible to also use the control means 19 as condenser-temperature detection means because a value output to the circulation pump correlates with a circulation temperature of the circulation pump at the suction side of the exhaust-heat recovery pipe by using the fact that the control means 19 receives an exhaust-heat recovery temperature from the exhaust-heat-recovery-temperature detection means of detecting the temperature of a heat transport medium at the exit side of the exhaust-heat recovery pipe 12 and controls the output of the circulation pump 11 so that the exhaust-heat recovery temperature becomes a predetermined temperature (60° to 80° C.). Therefore, it is possible to further downsize and rationalize the fuel-cell power-generation system.

Then, another embodiment of the present invention is described below by referring to the accompanying drawings.

Embodiment 6

Figure 6:
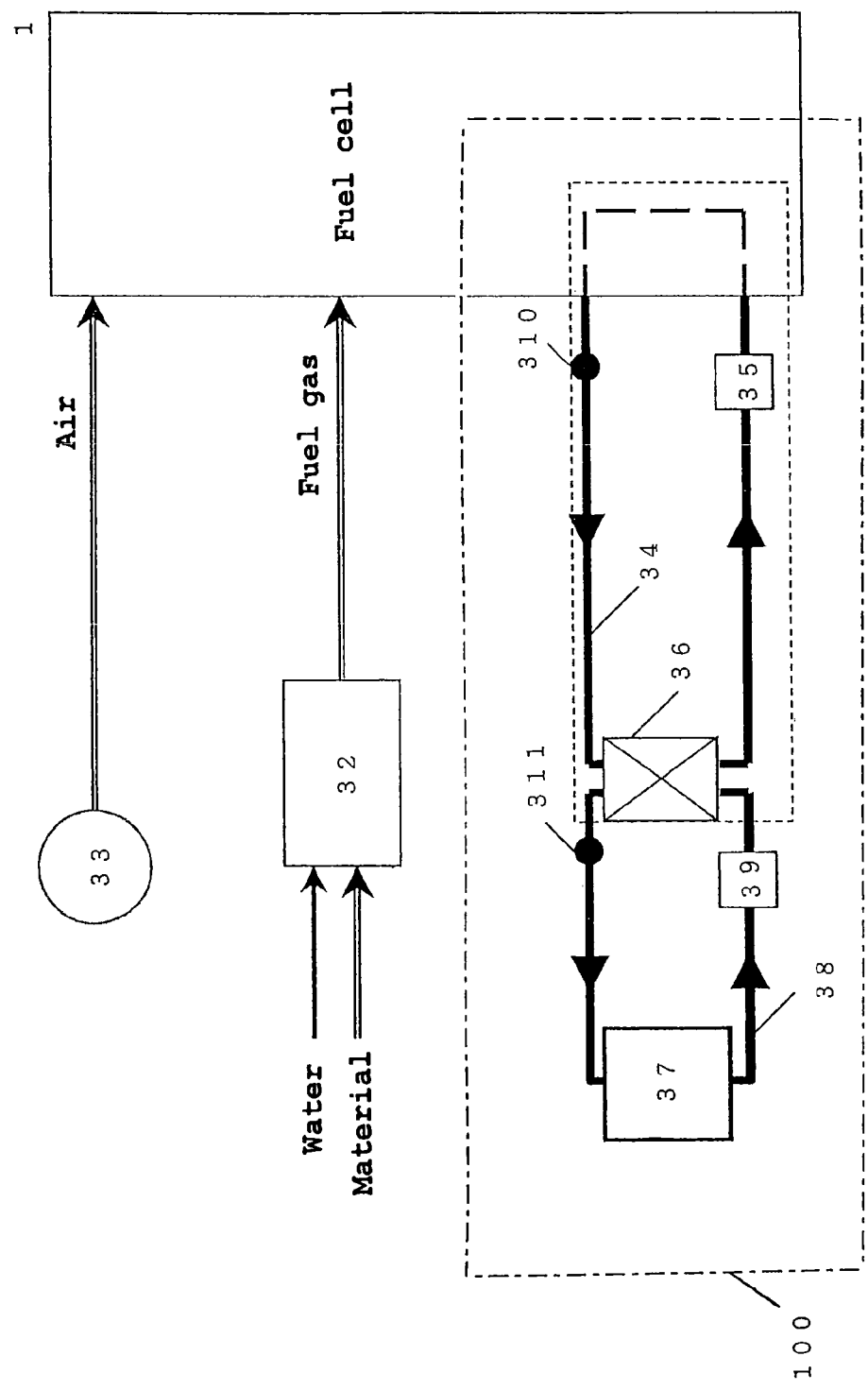
FIG. 6 is a block diagram showing a fuel-cell power-generation system of an embodiment of the present invention.

FIG. 6 is an illustration showing a configuration of a fuel-cell power-generation system of sixth embodiment of the present invention.

As shown in FIG. 6, the fuel-cell power-generation system of this embodiment is provided with a fuel cell 1 of generating power by using a fuel gas and an oxidant, a fuel generator 32 of generating a hydrogen-rich fuel gas by adding water to a power-generation material such as a natural gas and reforming the material, a blower 33 of supplying air to the fuel cell 1 as an oxidant, a cooling pipe 34 of supplying cooling water serving as a first heating medium of taking out the heat generated by the fuel cell 1 to the outside to the fuel cell 1, a cooling-water pump 35 located at the cooling pipe 34 to carry cooling water, a heat exchanger 36 of transferring the heat of the cooling water serving as the first heating medium to city water serving as a second heating medium, a hot-water storage tank 37 of storing city water, a city-water pipe 38 of connecting the heat exchanger 36 with the hot-water storage tank 37, and a city-water pump 39 of carrying city water.

Figure 7:
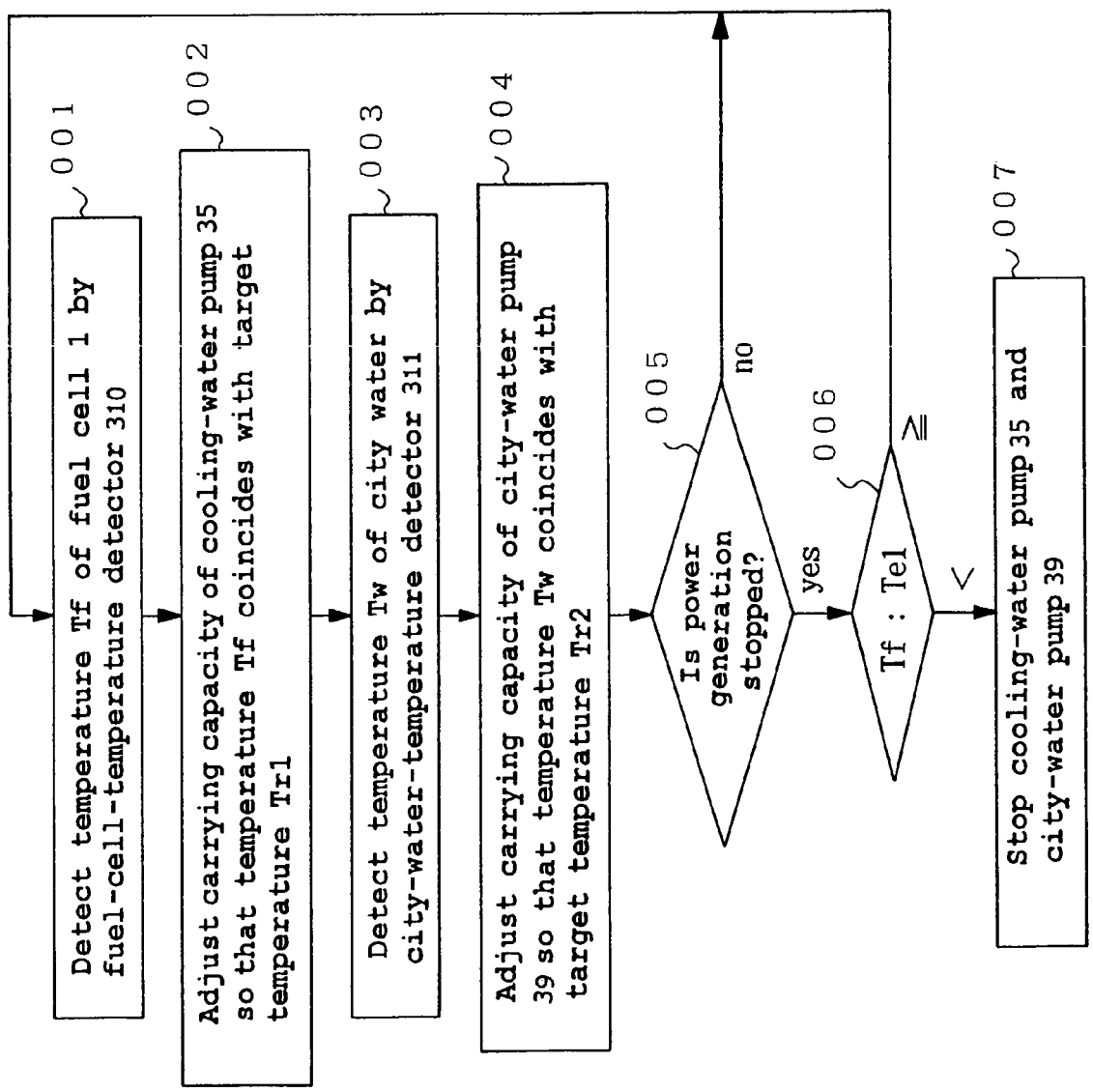
FIG. 7 is a flow chart showing an operation mode under and after power generation by a fuel-cell power-generation system of embodiment 6 of the present invention.

FIG. 7 is a flowchart showing operation modes of the cooling-water pump 35 and city-water pump 39 while the fuel-cell power-generation system of the embodiment 6 of the present invention generates power and after power generation is stopped.

Operations of the fuel-cell power-generation system of this embodiment having the above configuration are described below.

The fuel cell 1 generates power and heat using the hydrogen-rich fuel gas generated by the fuel generator 32 and the air supplied by the blower 33.

Because the fuel generator 32 generates a hydrogen-rich fuel gas by adding water to a power-generation material such as a natural gas, it is kept at a high temperature (approx. 700° C.) by a burner (not illustrated).

The heat generated by the fuel cell 1 is carried to the outside by the cooling water flowing through the cooling pipe 34. The flow rate of the cooling water adjusts the carrying capacity of the cooling pump 35 for the temperature Tf of the cooling water detected by a fuel-cell-temperature detector 310 set to a position where the cooling water flows out of the fuel cell 1 to coincide with a target temperature Tr1 (approx. 70° C.). In this case, because it is considered that the temperature of the fuel cell 1 is approximately equal to the temperature of the cooling water flowing out of the fuel cell 1, it is possible to regard the temperature detected by the fuel-cell-temperature detector 310 as the temperature of the fuel cell 1.

The heat obtained by the cooling water is transferred to the city water flowing through the city-water pipe 38 through the heat exchanger 36. The flow rate of the city water adjusts the carrying capacity of the city-water pump 39 so that the temperature Tw of city water detected by a city-water-temperature detector 311 set to a position where the city water flows out of the heat exchanger 36 coincides with a target temperature Tr2 (approx. 60° C.).

Then, to end the power generation by the fuel cell 1, supply of a material gas and water to the fuel generator 32 is stopped and at the same time, an inert gas such as nitrogen is supplied to circulation paths of the material gas and a fuel gas extending from the fuel generator 32 to the fuel cell 1 and circulation paths of the material gas and fuel gas in the fuel cell 1 to exhaust combustible gases remaining in the fuel generator, circulation paths, and fuel cell 1 from the fuel cell generator.

The embodiment of the present invention is more minutely described below by referring to the flowchart in FIG. 7.

First, a fuel-cell-temperature detector 310 detects the temperature Tf of the cooling water flowing out of the fuel cell 1 corresponding to the temperature of the fuel cell 1 under power generation (001).

When the detected temperature Tf is higher than the predetermined target temperature Tr1, the cooling-water carrying capacity of the cooling-water pump 35 is increased but when the detected temperature Tf is lower than the target temperature Tr1, the cooling-water carrying capacity of the cooling-water pump 35 is decreased (002). In this case, to decide the cooling-water carrying capacity of the cooling-water pump 35, it is allowed to operate the cooling-water pump 35 by using a generally-used PID controller and thereby computing the cooling-water carrying capacity of the cooling-water pump 35 so that the temperature Tf of the cooling water coincides with the target temperature Tr1.

Then, the city-water detector 311 detects the temperature Tw of the city water flowing out of the heat exchanger 36 (003).

When the detected temperature Tw is higher than the predetermined target temperature Tr2, the city-water carrying capacity of the city-water pump 39 is increased but when the detected temperature Tw is lower than the target temperature Tr2, the city-water carrying capacity of the city-water pump 39 is decreased (004). In this case, to decide the city-water carrying capacity of the city-water pump 39, it is allowed to operate the city-water pump 39 by using a generally-used PID controller and thereby computing the city-water carrying capacity of the city-water pump 39 so that the temperature Tw of the city water may be consistent with the target temperature Tr2.

Then, a system controller, not illustrated, determines whether power generation by the fuel-cell power-generation system is stopped (005). When power generation is in operation, step 001 is restarted to repeat operations according to the above flow.

However, when the power generation by the fuel cell 1 is stopped, supply of a fuel cell from the fuel generator 32 and supply of air from the blower 33 are stopped and introduction of an inert gas to the fuel generator 32 and fuel cell 1 is started. The fuel-cell-temperature detector 310 compares the temperature Tf of cooling water with a predetermined threshold temperature Te1 (approx. 60° C.) (006) and when the temperature Tf of the cooling water is higher than the threshold temperature Te1 (approx. 60° C.), and returns to step 001 to repeat operations according to the above flow.

When the temperature Tf of the cooling water becomes lower than the threshold temperature Te1 (approx. 60° C.), operations of the cooling-water pump 35 and city-water pump 39 are stopped.

As described above, in the case of this embodiment, the cooling-water pump 35 and city-water pump 39 for carrying the heat generated by the fuel cell 1 to the outside continues operations even if the power generation by the fuel cell 1 is stopped. Therefore, even if an inert gas such as nitrogen is supplied to the fuel cell 1 through circulation paths of the material gas and fuel gas of the fuel generator 32 and fuel cell 1, the heat held by the inert gas and the high-temperature remaining fuel gas to be carried by the inert gas is exhausted to the outside through cooling water. Therefore, the fuel cell 1 does not even locally become high in temperature. Therefore, even if the solid polymer type is used for the fuel cell 1, a solid polymer film is not dried or the power-generation efficiency of the fuel cell 1 is not extremely deteriorated.

Moreover, it is possible to efficiently recover the heat generated under the power generation by the fuel cell 1 by continuing operations of the cooling-water pump 35 and city-water pump 39 even if the fuel cell 1 stops power generation and stopping the operations when the temperature Tf of cooling water becomes lower than the threshold temperature Te1.

Furthermore, when the temperature Tf of the cooling water is lower than the threshold temperature Te1, the temperature of the stored hot city water is not extremely lowered because the cooling-water pump 35 and city-water pump 39 are stopped and it is possible to keep the city water at a very-useful temperature.

Embodiment 7

Then, embodiment 7 of the present invention is described below.

Because this embodiment also has the same configuration as the embodiment 6, FIG. 6 is used for the description of this embodiment and the fuel-cell power-generation system of the embodiment 6 of the present invention applies to the detailed description of this embodiment.

Figure 8:
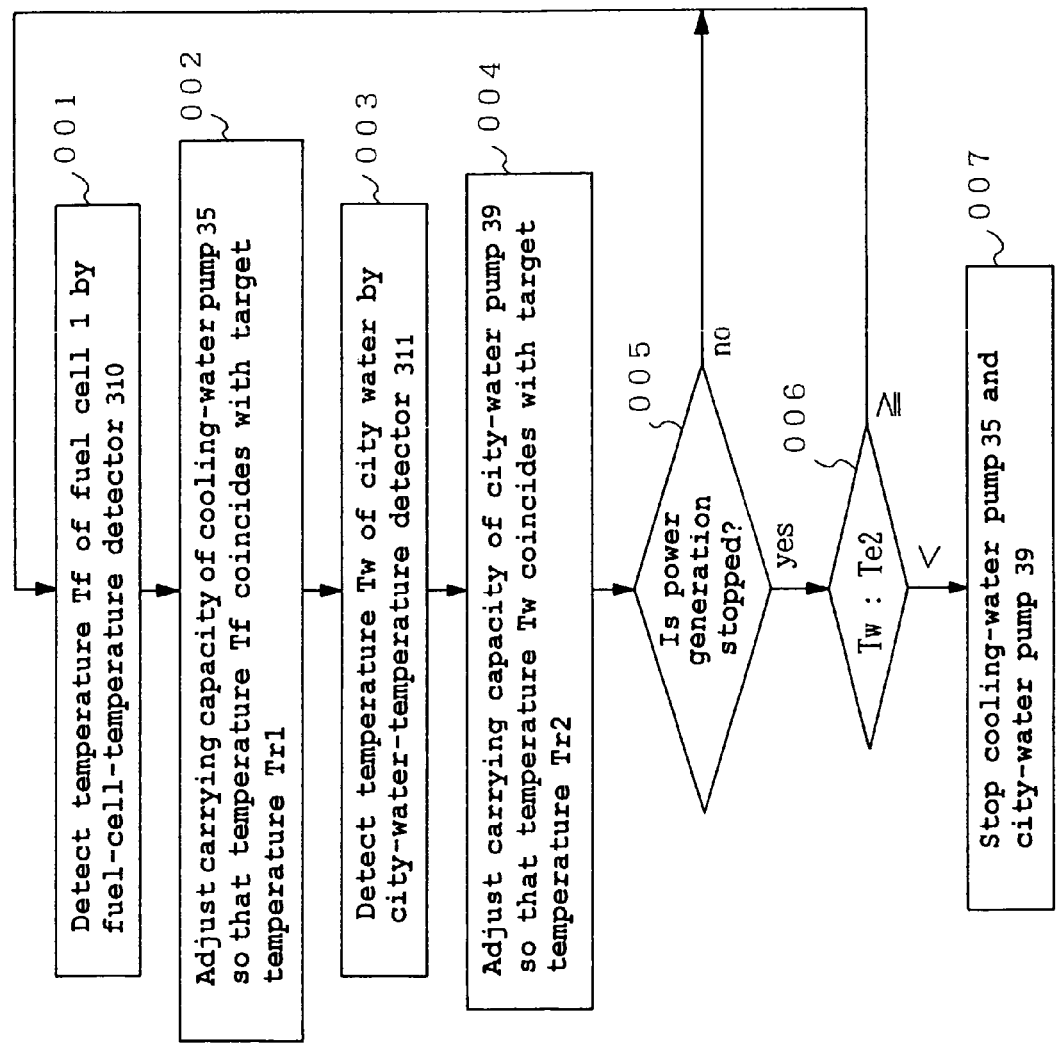
FIG. 8 is a flowchart showing an operation mode under and after power generation by a fuel-cell power-generation system of embodiment 7 of the present invention.

Moreover, FIG. 8 is a flowchart showing operation modes of a cooling-water pump 35 and city-water pump 39 while the fuel-cell power-generation system of the embodiment 7 of the present invention generates power and after the power generation is stopped.

Operations of the fuel-cell power-generation system of this embodiment having the above configuration are described below.

First, a fuel-cell-temperature detector 310 detects the temperature Tf of the cooling water flowing out of a fuel cell 1 corresponding to the temperature of the fuel cell 1 (001).

When the detected temperature Tf is higher than the predetermined target temperature Tr1, the cooling-water carrying capacity of the cooling-water pump 35 is increased but when the detected temperature Tf is lower than the target temperature Tr1, the cooling-water carrying capacity of the cooling-water pump 35 is decreased (002). In this case, to decide the cooling-water carrying capacity of the cooling-water pump 35, it is allowed to operate the cooling-water pump 35 by using a generally-used PID controller and thereby computing the cooling-water carrying capacity of the cooling-water pump 35 so that the temperature Tf of the cooling water coincides with the target temperature Tr1.

Then, a city-water-temperature detector 311 detects the temperature Tw of the city water flowing out of a heat exchanger 36 (003). When the detected temperature Tw is higher than a predetermined target temperature Tr2, the city-water carrying capacity of the city-water pump 39 is increased but when the detected temperature Tw is lower than the target temperature Tr2, the city-water carrying capacity of the city-water pump 39 is decreased (004). In this case, to decide the city-water carrying capacity of the city-water pump 39, it is allowed to operate the city-water pump 39 by using a generally-used PID controller and thereby, computing the city-water carrying capacity of the city-water pump 39 so that the temperature Tw of city water coincides with the target temperature Tr2.

Then, a not-illustrated system controller determines whether the power generation by the fuel-cell power-generation system is stopped (005). When the power generation is continued, step 001 is restarted to repeat operations according to the above flow.

However, when the power generation by the fuel cell 1 is stopped, the temperature Tw of city water is compared with a predetermined threshold temperature Te2 (approx. 55° C.) (006). When the temperature Tw of the city water is higher than the threshold temperature Te2 (approx. 55° C.), step 001 is restarted to repeat operations according to the above flow.

When the temperature Tw of the city water becomes lower than the threshold temperature Te2 (approx. 55° C.), operations of the cooling-water pump 35 and city-water pump 39 are stopped.

As described above, in the case of this embodiment, it is possible to efficiently recover the heat generated under the power generation by the fuel cell 1 and kept in the fuel cell 1 after the power generation is stopped by continuing operations of the cooling-water pump 35 and city-water pump 39 for carrying the heat generated by the fuel cell 1 to the outside when the power generation by the fuel-cell power-generation system is stopped even if the power generation by the fuel cell 1 is stopped and stopping the operations when the temperature Tw of the city water becomes lower than the threshold temperature Te2.

Moreover, when the temperature Tw of the city water is lower than the threshold temperature Te2, the cooling-water pump 35 and city-water pump 39 are stopped. Therefore, it is possible to continuously store the city water at a very-useful temperature without excessively lowering the temperature of stored hot city water.

Furthermore, because the timing for stopping the cooling-water pump 35 and city-water pump 39 is decided in accordance with the temperature of city water actually using heat, it is possible to accurately manage the temperature of stored hot water.

Furthermore, the fuel cell 1 does not even locally become a high temperature because the heat held by an inert gas and high-temperature remaining gases carried by the inert gas is exhausted to the outside through cooling water even if the inert gas such as nitrogen is supplied to the fuel cell 1 through circulation paths of the material gas and fuel gas of the fuel generator 32 and fuel cell 1 when power generation is stopped the same as the case of the embodiment 6. Therefore, even if using the solid macromolecular type for the fuel cell 1, a solid macromolecular film is not locally dried or a trouble of extremely deteriorating the power-generation efficiency of the fuel cell 1 does not occur.

Though the target temperature Tr1 of the fuel cell 1 is set to 70° C. and the target temperature Tr2 of city water is set to 60° C. in the case of the embodiments 6 and 7 of the present invention, the target temperature Tr1 should be set to a temperature at which the power generation by the fuel cell 1 is efficiently performed and therefore, it is not restricted to 70° C. Moreover, the target temperature Tr2 should be set to a temperature requested to store city water in the hot-water storage tank 37 and it is not restricted to 60° C.

Furthermore, though the threshold temperature Te1 for stopping operations of the cooling-water pump 35 and city-water pump 39 is set to 60° C. in the case of the embodiment 6 of the present invention, the temperature Te1 should be set to a temperature several degrees higher than the temperature requested to store city water in the hot-water storage tank 37 by considering a loss in the heat exchanger 36 and it is not restricted to 60° C.

Furthermore, though the threshold temperature Te2 for stopping operations of the cooling-water pump 35 and city-water pump 39 is set to 55° C. in the case of the embodiment 7 of the present invention, it should be set to a temperature requested to store city water in the hot-water storage tank 37 and it is not restricted to 55° C.

Furthermore, in the case of the above embodiments 6 and 7, the fuel cell 1 serves one thing of a fuel cell of the present invention and the cooling pipe 34 serves one thing of a cooling-circulation system of the present invention. Moreover, the cooling-water pump 35 serves as one thing of heating-medium circulation means of the present invention, the heat exchanger 36 and city-water pump 39 respectively serve as one thing of heat release means or a heat exchanger of the present invention, and the fuel-cell-temperature detector 310 and city-water-temperature detector 311 respectively serve as one thing of temperature detection means of the present invention. Furthermore, the cooling water flowing through the cooling pipe 34 serves as one thing of a first heating medium of the present invention and the city water to be carried through the city-water pipe 38 serves as one thing of a second heating medium of the present invention.

The present invention is not restricted to the configuration of the above embodiment 6 or 7. It is allowed that temperature detection means of the present invention obtains the temperature of the fuel cell 1 by directly measuring it. Moreover, it is allowed to measure the temperature of the heat exchanger 36 or the temperature of the city-water pipe 38. In short, temperature detection means of the present invention can directly or indirectly detect the temperature of a fuel cell. Moreover, it is enough that the temperature of the second heating medium of the present invention can be detected but is not restricted by a temperature-measuring portion of the medium.

Furthermore, it is not necessary to restrict the first heating medium of the present invention to cooling water ($H_2O$) but it is possible to use any insulating medium such as an antifreeze as long as the medium can sufficiently carry the heat of a fuel cell.

Furthermore, it is allowed that heat release means of the present invention has a configuration in which the heat exchanger 36 releases heat into air without using the hot-water storage tank 37 and city-water pipe 38. In this case, only the pump 35 corresponding to heating-medium circulation means operates up to a predetermined threshold value. Furthermore, it is allowed that heat release means has a configuration of performing the operation for heat release such as the circulation of the heating medium or only heating-medium circulation means operates even after supply of a fuel and oxidant to a fuel cell is stopped.

Furthermore, the cooling system (refer to symbol 100 in FIG. 6) in a fuel-cell cooling method of the present invention is constituted by at least a cooling-circulation system, heating-medium circulation means, and heat release means in a fuel-cell power-generation system of the present invention.

As described above, the present invention makes it possible to efficiently recover the heat generated by the fuel cell 1 under power generation by continuing operations of the cooling-water pump 35 and city-water pump 39 until the temperature Tr of cooling water becomes lower than the threshold temperature Te1 (approx. 60° C.) or the temperature Tw of city water becomes lower than the threshold temperature Te2 (approx. 55° C.). Because the cooling-water pump 35 and city-water pump 39 are stopped when the temperature of cooling water or city water becomes lower than the threshold temperature, it is possible to continuously store hot city water at a very-useful temperature without excessively lowering the temperature of stored hot city water.

Moreover, because the temperature of the fuel cell 1 is not raised due to an inert gas passing through material-gas and fuel-gas paths after power generation is stopped, a solid macromolecular film is not dried even if using the solid macromolecular type for the fuel cell 1 or the power generation efficiency of the fuel cell 1 is not extremely deteriorated and thus, it is possible to provide a high-reliability fuel-cell power-generation system.

INDUSTRIAL APPLICABILITY

As described above, the present invention makes it possible to provide a fuel-cell power-generation system not causing a trouble in power generation by a fuel cell without using ion removal means.

Moreover, according to a fuel-cell power-generation system of the present invention, the following advantages can be obtained.

Because a configuration of always monitoring the condensation capacity of a condenser and storing the exhaust heat of a fuel cell in heat-using means when a sufficient condensation capacity is left is used, water can be self-supported without receiving water from the outside by using the recovered water obtained by condensing the water for reforming and shifting a fuel treater to a reformer or carbon-monoxide shifter and the water for humidifying supply gas and supply air by a fuel-side humidifier and oxidation-side humidifier by a condenser.

Moreover, it is possible to prevent a reformation catalyst or shift catalyst stored in the reformer and carbon-monoxide shifter of a fuel treater from being deteriorated due to chlorine ions when water (city water) is supplied from the outside or metallic ions eluted from a pipeline.

Furthermore, it is possible to prevent a trouble from occurring in the power generation by a fuel cell caused by the fact that a fuel gas or oxidant gas is ionized and electric conductivity is raised.

Furthermore, it is possible to reduce the frequency of regular maintenance of ion removal means or abolish the maintenance by greatly reducing the number of ion removal means such as ion exchange resins for removing chlorine ions from general water such as city water in a fuel-gas supply system or oxidant-gas supply system or decreasing the degree of deterioration of the ion removal capacity corresponding to an operation period.

Furthermore, because the output of a circulation pump is controlled by control means so that an exhaust-heat recover temperature becomes equal to a predetermined temperature by exhaust-heat-recovery-temperature detection means, hot water can be stored in a hot-water tank like a laminated state from the upper portion. Therefore, in the case of the normal configuration of a hot-water supply pipe in which a hot-water-supply pipe opening is formed on the upper portion of a hot-water tank, it is possible to always secure the temperature of stored hot water at a high temperature (60° to 80° C.). Therefore, even if the quantity of the stored hot water in the tank is entirely exhausted, it is possible to secure the necessary minimum quantity of hot water in accordance with power generation in a short time. Therefore, hot water at an available temperature can be obtained in a short time and convenience is further improved as compared with the case of uniformly heating water in the whole tank.

Furthermore, the present invention makes it possible to provide a fuel-cell power-generation system not deteriorating the power generation efficiency of a fuel cell after power generation is completed.

Furthermore, the present invention makes it possible to provide a fuel-cell power-generation system of efficiently taking out the heat generated in a fuel cell to the outside and using the heat in an effective mode.

The invention claimed is:

1. A method of operating a fuel-cell power-generation system comprising the steps of:
   (i) circulating a first heating medium in a closed cooling-circulation system, which is different from pathways for a fuel and an oxidant to pass through a fuel cell, by operating a first heating-medium circulation means so that the first heating medium passes through the fuel cell and carries heat produced while the fuel cell generates power,
   (ii) circulating a second heating medium in a pipe by operating a second heating-medium circulation means so that the second heating medium recovers the heat, which is retained by the first heating medium, via a heat exchanger,
   (iii) continuing to operate the first heating-medium circulation means after generating of power by the fuel cell has stopped,
   (iv) continuing to circulate the first heating medium in the cooling circulation system through the fuel cell and the heat exchanger, which has been closed, until operation of the first heating-medium circulation means is stopped, and
   (v) circulating the second heating medium, while the step (iv) continues to circulate the first heating medium, by operating the second heating-medium circulation means so that the second heating medium recovers the heat, which is retained by the first heating medium, via the heat exchanger.

2. The method of operating a fuel-cell power-generation system according to claim 1, wherein the step (iii) comprises continuing to operate the first heating-medium circulation means after supplying of the fuel and the oxidant to the fuel cell has stopped.

3. The method of operating a fuel-cell power-generation system according to claim 1, wherein the step (iv) comprises continuing to circulate only the first heating medium in the cooling-circulation system.

4. The method of operating a fuel-cell power-generation system according to claim 1, wherein the step (v) continues to circulate the second heating medium while the step (iv) continues to circulate the first heating medium, until a temperature of the fuel cell is at a predetermined threshold value after generating of power by the fuel cell has stopped.

5. The method of operating a fuel-cell power-generation system according to claim 4, wherein the temperature of the fuel cell is a temperature of the first heating medium or the cooling-circulation system.

6. The method of operating a fuel-cell power-generation system according to claim 1, wherein the step (v) continues to circulate the second heating medium while the step (iv) continues to circulate the first heating medium, until a temperature of the second heating medium that has passed through the heat exchanger is at a predetermined threshold value after generating of power by the fuel cell has stopped.

7. The method of operating a fuel-cell power-generation system according to claim 1, wherein the steps (ii) and (v) comprise storing, in a heat storage means, the second heating medium that has recovered the heat, which is retained by the first heating medium, via the heat exchanger.

* * * * *